(12) United States Patent
George

(10) Patent No.: US 6,874,800 B2
(45) Date of Patent: Apr. 5, 2005

(54) HOSPITAL BED WHEEL LINKAGE APPARATUS

(75) Inventor: Christopher M. George, Cincinnati, OH (US)

(73) Assignee: Hill-Rom Services, Inc., Wilmington, DE (US)

( * ) Notice: Subject to any disclaimer, the term of this patent is extended or adjusted under 35 U.S.C. 154(b) by 102 days.

(21) Appl. No.: 10/235,203

(22) Filed: Sep. 5, 2002

(65) Prior Publication Data

US 2003/0056291 A1 Mar. 27, 2003

Related U.S. Application Data

(60) Provisional application No. 60/317,324, filed on Sep. 5, 2001.

(51) Int. Cl.$^7$ .......................... B62B 3/00; B62D 51/04; A61G 7/10; A47B 71/00; A47B 7/00
(52) U.S. Cl. .................... 280/99; 280/47.11; 280/91.1; 180/19.1; 5/86.1; 5/600; 5/610; 5/620
(58) Field of Search ......................... 280/47.11, 79.11, 280/79.2, 79.3, 87.01, 87.042, 98, 99, 100, 101, 102, 103, 234, 81.1, 771, 91.1; 180/19.1–19.3, 408, 409, 400, 411, 418, 419, 422, 234, 236, 253, 242, 308, 907, 908; 5/81.1, 86.1, 600, 610, 620; 16/35 D; B62B 3/00, 7/04

(56) References Cited

U.S. PATENT DOCUMENTS

| | | | | |
|---|---|---|---|---|
| 1,585,753 A | * | 5/1926 | Arato | ...................... 280/99 |
| 1,621,856 A | | 3/1927 | Sedgwick | |
| 1,681,893 A | | 8/1928 | Barshell | |
| 1,716,732 A | | 6/1929 | Mossay | |
| 2,228,247 A | | 1/1941 | Cunningham | |
| 2,330,557 A | | 9/1943 | Collis | |
| 2,388,692 A | | 11/1945 | House | |
| 2,470,496 A | | 5/1949 | Krilanovich | |
| 2,497,425 A | | 2/1950 | Terry | |
| 2,551,821 A | | 5/1951 | Bengtson | |
| 2,756,066 A | | 7/1956 | Ludowici | |
| 2,814,499 A | | 11/1957 | Schlechter | |
| 2,834,605 A | | 5/1958 | McCollough | |
| 2,842,376 A | | 7/1958 | Krilanovich | |
| 2,915,319 A | | 12/1959 | Kumler et al. | |
| 2,950,121 A | | 8/1960 | Fisher | |
| 3,075,784 A | | 1/1963 | Beyerstedt | |
| 3,126,208 A | | 3/1964 | de Voghel | |
| 3,130,981 A | | 4/1964 | Christenson et al. | |
| 3,235,283 A | | 2/1966 | de Voghel | |
| 3,304,116 A | | 2/1967 | Stryker | |
| 3,392,987 A | * | 7/1968 | Muller et al. | ............... 180/409 |
| 3,393,004 A | | 7/1968 | Williams | |
| 3,398,971 A | | 8/1968 | Seidel | |
| 3,410,571 A | * | 11/1968 | Muriel | ........................ 280/99 |
| 3,414,286 A | * | 12/1968 | Muller et al. | ............... 180/409 |
| 3,529,848 A | * | 9/1970 | Harvey | ........................ 280/99 |
| 3,734,538 A | | 5/1973 | Humes | |
| 3,972,538 A | | 8/1976 | Breame | |
| 4,004,820 A | | 1/1977 | Weber | |
| 4,229,649 A | | 10/1980 | Hawkins et al. | |
| 4,248,444 A | | 2/1981 | Johnson | |
| 4,300,782 A | | 11/1981 | Pioth | |
| 4,335,626 A | | 6/1982 | Fisher | |

(Continued)

FOREIGN PATENT DOCUMENTS

| | | | |
|---|---|---|---|
| DE | 295 10 756 U | 10/1995 | |
| FR | 1.073.832 | 9/1954 | |
| WO | WO 99/43531 | * 9/1999 | ............... 280/47.11 |

*Primary Examiner*—Christopher P. Ellis
*Assistant Examiner*—Gerald B. Klebe
(74) *Attorney, Agent, or Firm*—Bose McKinney & Evans LLP

(57) ABSTRACT

A patient support including a linkage assembly providing communication between at least one front wheel and at least one rear wheel.

46 Claims, 12 Drawing Sheets

U.S. PATENT DOCUMENTS

| | | | |
|---|---|---|---|
| 4,592,561 A | * | 6/1986 | Furukawa et al. .......... 180/409 |
| 4,852,679 A | | 8/1989 | Fry |
| 4,934,726 A | | 6/1990 | Daenens et al. |
| 5,163,189 A | * | 11/1992 | DeGray ........................ 5/86.1 |
| 5,174,593 A | | 12/1992 | Chapman |
| 5,348,326 A | | 9/1994 | Fullenkamp et al. |
| 5,899,469 A | | 5/1999 | Pinto et al. |
| 5,906,017 A | | 5/1999 | Ferrand et al. |
| 5,964,471 A | | 10/1999 | Copland |
| 6,098,216 A | | 8/2000 | Williamson et al. |
| 6,256,812 B1 | | 7/2001 | Bartow et al. |
| 6,321,878 B1 | | 11/2001 | Mobley et al. |
| 2004/0056444 A1 | * | 3/2004 | Bidwell ....................... 280/99 |

\* cited by examiner

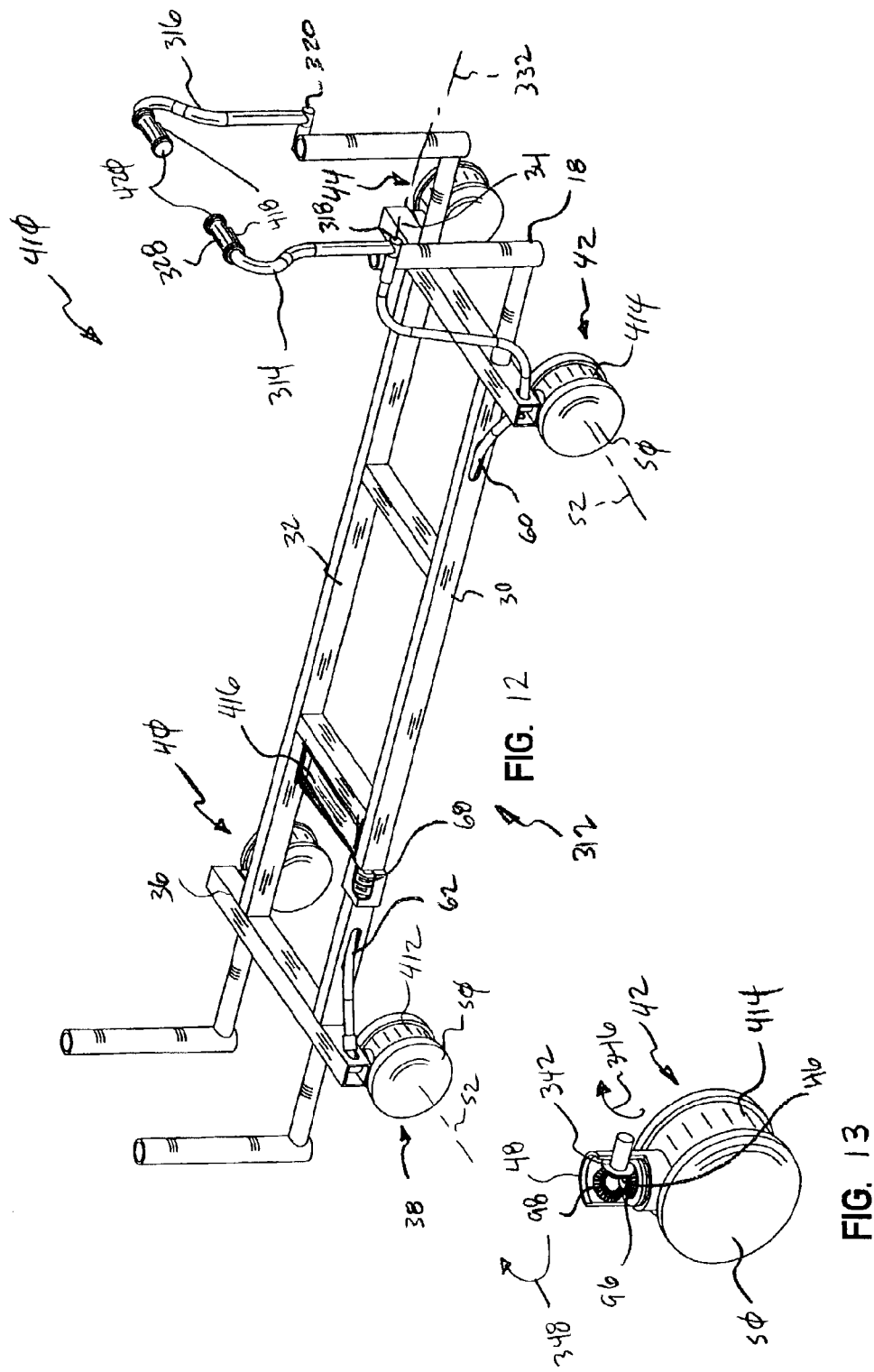

HOSPITAL BED WHEEL LINKAGE APPARATUS

CROSS-REFERENCE TO RELATED APPLICATION

This application claims the benefit of U.S. Provisional Patent Application Ser. No. 60/317,324, filed Sep. 5, 2001, the disclosure of which is expressly incorporated by reference herein.

BACKGROUND AND SUMMARY OF THE INVENTION

The present invention relates generally to a steering mechanism for a vehicle and, more particularly, to a steering mechanism for use with a patient support, such as a hospital bed, a stretcher, a patient carriage, a transport table or a cart.

The present invention provides a vehicle comprising a first wheel supported for rotational movement about a first substantially horizontal axis and supported for pivoting movement about a first substantially vertical axis. The vehicle further comprises a second wheel supported in spaced relation to the first wheel, the second wheel supported for rotational movement about a second substantially horizontal axis and supported for pivoting movement about a second substantially vertical axis. A linkage assembly includes a wheel coupling configured to provide communication between the first wheel and the second wheel, wherein a driving pivoting movement of the second wheel causes the wheel coupling to transmit a passive pivoting movement to the first wheel.

An elastic device is illustratively connected to the wheel coupling, wherein the elastic device establishes a lower torque limit below which the driving pivoting movement of the second wheel is not transmitted as a passive pivoting movement by the wheel coupling to the first wheel. A release coupling is illustratively provided in communication with the wheel coupling, wherein the release coupling establishes an upper torque limit above which the driving pivoting movement of the second wheel is not transmitted as passive pivoting movement by the wheel coupling to the first wheel.

A method of moving a patient support is also disclosed, the method comprising the steps of providing a frame coupled to the patient support surface, providing a first wheel supporting the frame, and providing a second wheel supporting the frame in longitudinally spaced relation to the first wheel. The method further comprises the steps of pivoting the second wheel about a substantially vertical axis to a driving position, and selectively driving the first wheel in pivoting movement about a substantially vertical axis in response to the driving position of the second wheel relative to the passive position of the first wheel. Illustratively, the first wheel is driven in pivoting movement only when the differential between the driving position of the second wheel and the passive position of the first wheel is at least as great as a predetermined minimum value. Further illustratively, the first wheel is driven in pivoting movement only when the differential between the driving position of the second wheel and the passive position of the first wheel is no greater than a predetermined maximum value.

In a further illustrative embodiment of the patient support of the present invention, a frame defines a longitudinal axis, a patient support surface is coupled to the frame, and a first wheel is coupled to the frame and is configured to rotate about a first substantially horizontal axis and to pivot about a first substantially vertical axis. A second wheel is coupled to the frame in longitudinally spaced relation to the first wheel, the second wheel being configured to rotate about a substantially horizontal axis and to pivot about a substantially vertical axis. The patient support further includes a handle pivotally coupled to the frame, and an input coupling operably connecting the handle and the second wheel, the input coupling configured to cause pivoting movement of the second wheel about the second substantially vertical axis in response to pivoting movement of the handle.

According to a further illustrative embodiment of the patient support of the present invention, a frame defines a longitudinal axis, a patient support surface is coupled to the frame, a first wheel is coupled to the frame and is configured to rotate about a first substantially horizontal axis and is configured to pivot about a first substantially vertical axis, and a second wheel is coupled to the frame in longitudinally spaced relation to the first wheel, the second wheel being configured to rotate about a substantially horizontal axis and to pivot about a second substantially vertical axis. A first actuator is operably coupled to the first wheel to drive the first wheel in rotation about the first substantially horizontal axis, and a second actuator is operably coupled to the second wheel to drive the second wheel in rotation about the second substantially horizontal axis. A controller is configured to cause the first actuator to drive the first wheel in a first direction about the first substantially horizontal axis and to cause the second actuator to drive the second wheel in a second direction about the second substantially horizontal axis, the first direction being opposite the second direction, in response to pivoting movement of the handle during a powered rotation mode of operation. Illustratively, the controller is further configured to cause the first actuator to drive the first wheel in the first direction about the first substantially horizontal axis and to cause the second actuator to drive the second wheel in the first direction about the second substantially horizontal axis, in response to pivoting movement of the handle during a powered slide mode of operation.

The linkage assembly of the present invention allows a vehicle to move in a manner similar to that of a vehicle including a centrally mounted fifth wheel. The linkage assembly enhances the maneuverability of the vehicle by linking a first wheel and a second wheel in a manner causing both interconnected wheels to pivot simultaneously about respective vertical axes in opposite directions. The elastic member provides for torsional play within the wheel coupling thereby allowing the vehicle to be positioned as if it had independent freely pivoting wheels. Additionally, if the release coupling is automatic, then no physical activation or manual input is required by an operator.

Additional features of the present invention will become apparent to those skilled in the art upon a consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which:

FIG. 12 is a perspective view of a further illustrative embodiment of the wheel linkage apparatus of the present invention, including actuators operably coupled to the first and second wheels;

FIG. 13 is a detailed perspective view of a gear transmission assembly and an actuator operably coupled to a wheel of the bed linkage apparatus of FIG. 12;

DETAILED DESCRIPTION OF THE DRAWINGS

Figure 1:
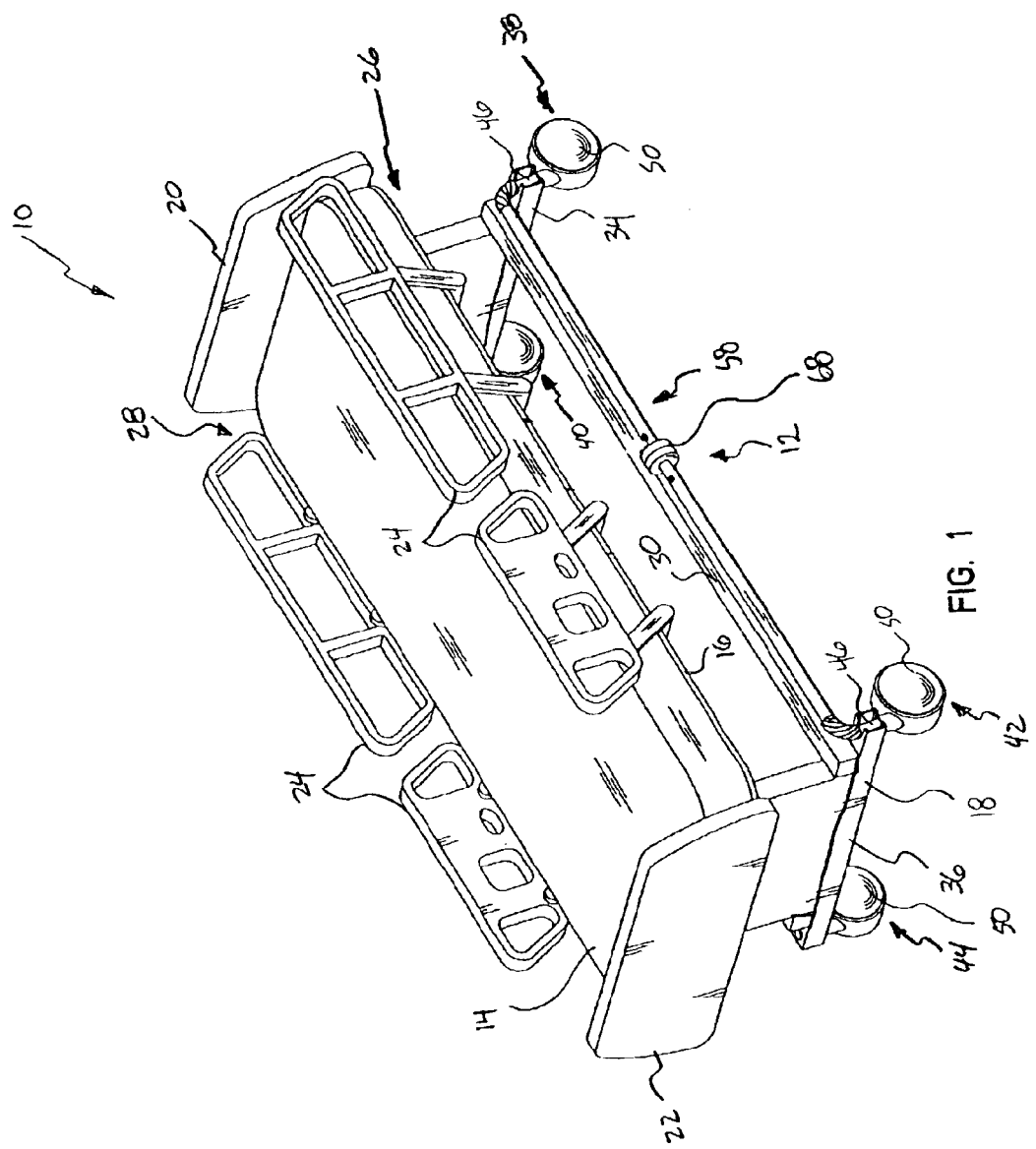
FIG. 1 is a perspective view of a patient support incorporating a first illustrative embodiment of the wheel linkage apparatus of the present invention.

Referring initially to FIG. 1, a patient support, such as hospital bed 10 for use in health care facilities, is illustrated as incorporating a wheel linkage apparatus 12 of the present invention. While the linkage apparatus 12 of the present invention is described herein for use in connection with a hospital bed 10, it should be appreciated that the linkage apparatus 12 may find equal applicability with any conventional vehicle including, but not limited to, forklifts, carts, trolleys, and various transport platforms.

The hospital bed 10 includes a mattress 14 located on an articulating deck 16 which is coupled to a base frame 18. The articulating deck 16 may be pivotally mounted to a conventional intermediate frame (not shown) which is vertically adjustable relative to the base frame 18 by means of a conventional high-low mechanism (not shown). Any suitable form of intermediate frame and high-low mechanism may be utilized without departing from the spirit and scope of this invention.

The hospital bed includes a headboard 20 supported proximate a head end of the bed and a foot board 22 supported proximate a foot end of the bed 10. Conventional side rails 24 are illustratively supported proximate opposing longitudinal left and right side edges 26 and 28 of the bed 10. The side rails 24 are supported for vertical movement between a first position located above the mattress 14 and a second position located below the mattress 14.

Figure 2:
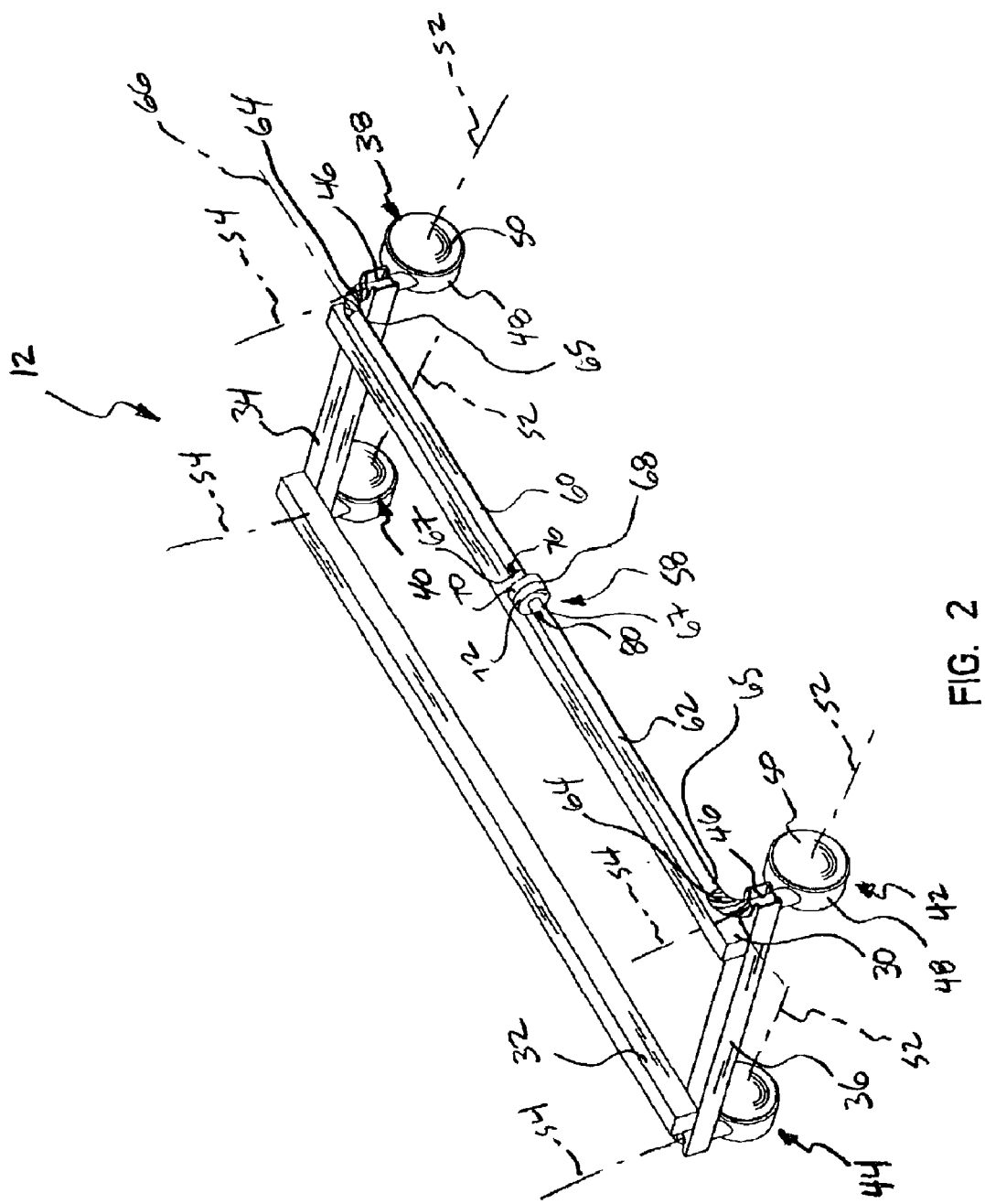
FIG. 2 is a perspective view of the first illustrative embodiment of the wheel linkage apparatus of the present invention.

Referring now to FIGS. 1 and 2, the base frame 18 includes two spaced apart longitudinally extending side frame members 30, 32 connected by a laterally extending head end cross member 34 and a laterally extending foot end cross member 36. First and second front caster devices 38, 40 are supported by the head end cross member 34 while first and second rear caster devices 42, 44 are supported by the foot end cross member 36.

Figure 5:
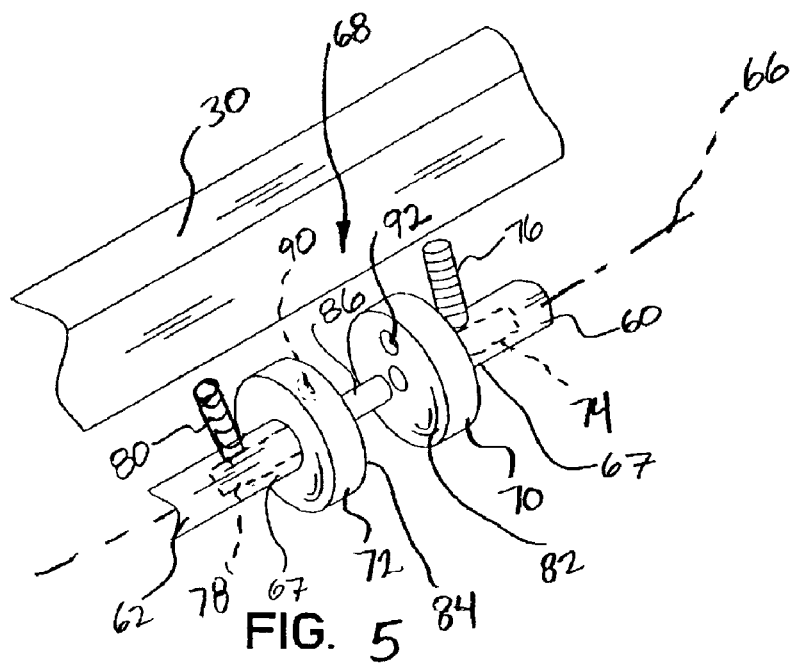
FIG. 5 is a detailed partially exploded perspective view of an overload coupling of the wheel linkage apparatus of the present invention.

Each caster device 38, 40, 42 and 44 includes a mounting stud 46 which extends vertically upwardly from the top side of a caster housing 48. A wheel 50 is supported within the housing 48 for rotation about a substantially horizontal axis 52. Likewise, the mounting stud 46 supports the housing 48 and wheel 50 for pivoting movement about a substantially vertical axis 54. More particularly, the mounting stud 46 may be supported for rotation within a mounting slot 56 formed within an end of one of the cross members 34 and 36 (FIG. 5).

Referring further to FIG. 2, a first embodiment of the linkage apparatus 12 of the present invention is illustrated as including a connector or wheel coupling 58 providing communication between the first front caster device 38 and the first rear caster device 42. The wheel coupling 58 provides for communication between caster devices 38 and 42 positioned proximate the same longitudinal side 26 of the base frame 18. As may be appreciated, the wheel coupling 58 may likewise be positioned proximate the opposing longitudinal side 28 to provide communication between the second front caster device 40 and the second rear caster device 44. Alternatively, the wheel coupling 58 may be configured to provide communication between the first front caster device 38 and the second rear caster device 44, or between the second front caster device 40 and the first rear caster device 42. Finally, it should be noted that two sets of front and rear caster devices may be coupled by two different wheel couplings 58, or all four caster devices coupled together by a single wheel coupling 58.

The wheel coupling 58 illustratively includes first and second longitudinally extending transmission members or shafts 60 and 62 wherein the first transmission shaft 60 is operably connected to the first front caster device 38 and the second transmission shaft 62 is operably connected to the first rear caster device 42. While the illustrated transmission shafts 60 and 62 comprise substantially rigid rods, it should be appreciated that other power transmission elements may be readily substituted therefor, including flexible cables, belts, and chains. In the embodiment of FIG. 2, an elastic device or coupling 64 operably connects a distal end 65 of each transmission shaft 60 and 62 to the first front caster device 38 and the first rear caster device 42, respectively. The elastic coupling 64 illustratively comprises a conventional flex coupling such as a torsionally elastic bellows or torsion spring. One end of the flex coupling 64 is connected to the distal end 65 of the respective first and second shafts 60 and 62 while a second end of the flex coupling 64 is connected to a respective mounting stud 46 of caster device 38, 42.

The elastic coupling 64 provides a predetermined resistance to externally applied torque caused by pivoting movement of the caster devices 38 and 42 about their respective vertical axes 54. Moreover, the elastic coupling 64 is selected to have properties defining a predetermined lower torque limit below which rotational movement is not transmitted by the connector 58 between the caster devices 38 and 42. As such, driving pivoting movement of the caster 38 or 42 about its vertical axis 54 is transferred by the flex coupling 64 as rotational movement of the respective transmission shaft 60 or 62 about a longitudinal axis 66 only when the torque generated by the pivoting movement of the wheel 50 is above the lower torque limit. Since the torque transmitted by the wheel 50 is directly related to the amount of pivoting movement of the wheel 50, small fluctuations of position due to slight movement of the wheel 50 will not generate sufficient torque to exceed the lower torque limit, wherein pivoting movement will not be transmitted by the connector 58.

Referring now to FIGS. 2 and 5, a release or torque overload coupling 68 operably connects proximal ends 67 of the first and second transmission shafts 60 and 62. Illustratively, the release coupling 68 includes first and second discs 70 and 72 secured to the first and second transmission shafts 60 and 62, respectively. More particularly, the first disc 70 includes a mounting shaft 74 secured within a hollow interior of the first transmission shaft 60 through a conventional set screw 76. Likewise, the second disc 72 includes a mounting shaft 78 secured within the hollow interior of the second transmission shaft 62 through a conventional set screw 80. A substantially planar bearing surface 82 of the first disc 70 faces a substantially planar bearing surface 84 of the second disc 72. An alignment shaft 86 extends outwardly from the bearing surface 84 and is received within a bore 88 formed within the disc 70. A detent 90 is supported by and extends outwardly from the bearing surface 84 of the disc 72 and is receivable within a locking aperture 92 formed within the bearing surface 82 of the first disc 70. Illustratively, the detent 90 includes an arcuate outer surface to be received within the locking aperture 92, and may be spring biased to facilitate securement within the locking aperture 92.

In operation, rotation by either of the first and second transmission shafts 60 or 62 is transmitted by the release coupling 68 to the other transmission shaft 62 or 60, when the torque generated between the first and second transmission shafts 60 and 62 is not greater than a predetermined upper torque limit. Above the established upper torque limit, the detent 90 disengages from the locking aperture 92 such that rotational movement of the first or second transmission shaft 60 or 62 is not transferred to the other transmission shaft 62 or 60.

The release coupling 68 automatically disconnects the front and rear caster devices 38 and 42 when relative pivoting movement therebetween exceeds a predetermined amount, resulting in torque exceeding the predetermined upper torque limit. This is often the case when it is desired to move, or slide, the bed 10 in a lateral direction only such as for patient transfer or positioning of the bed in a confined space next to a wall. Since the release coupling 68 automatically disconnects when a torque above the upper torque limit is applied, no deliberate physical or manual activation is required by an operator.

In an alternative embodiment of the invention, the release coupling 68 may be manually activated by the operator. This may be desirable for relatively heavy bed platforms where the centrifugal force typically generated as the bed platform is driven around corners is greater than the average lateral push force which may be generated by an operator. As such, the torque generated during cornering may cause the release coupling 68 to automatically disconnect the front and rear caster devices 38 and 42. Illustratively, alternative embodiment release couplings 68 may comprise a mechanical linkage released clutch or an electromechanical solenoid activated one position latching clutch. In the mechanical linkage embodiment, an operator may activate the clutch, and thereby disengaging the front and rear caster devices 38 and 42, by pulling a handle which is connected to the clutch through a cable. In the electromechanical embodiment, a switch or sensor pad may be activated by an operator, thereby energizing the solenoid and disengaging the clutch.

Figure 3:
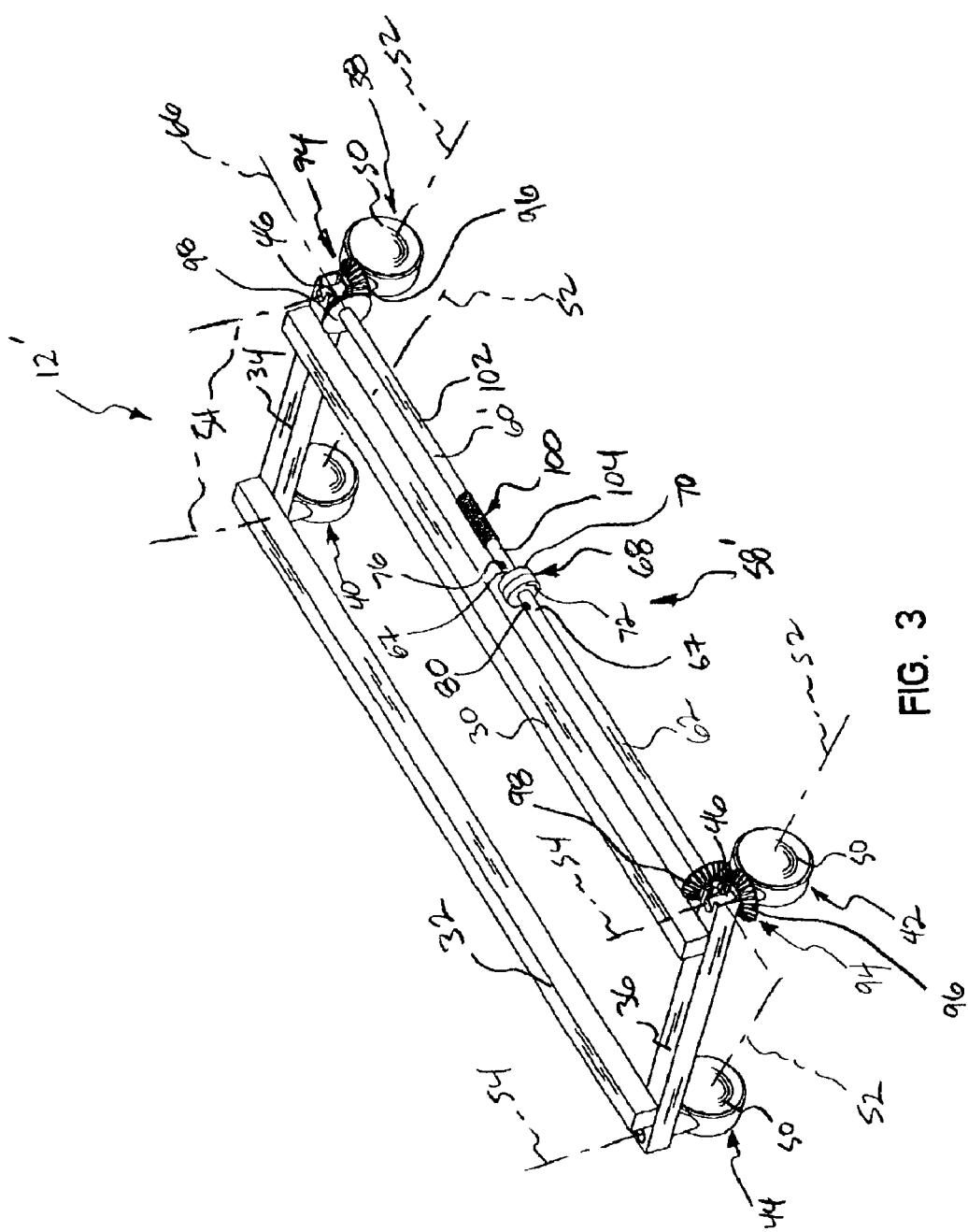
FIG. 3 is a perspective view of a further illustrative embodiment of the wheel linkage apparatus of the present invention.
Figure 4:
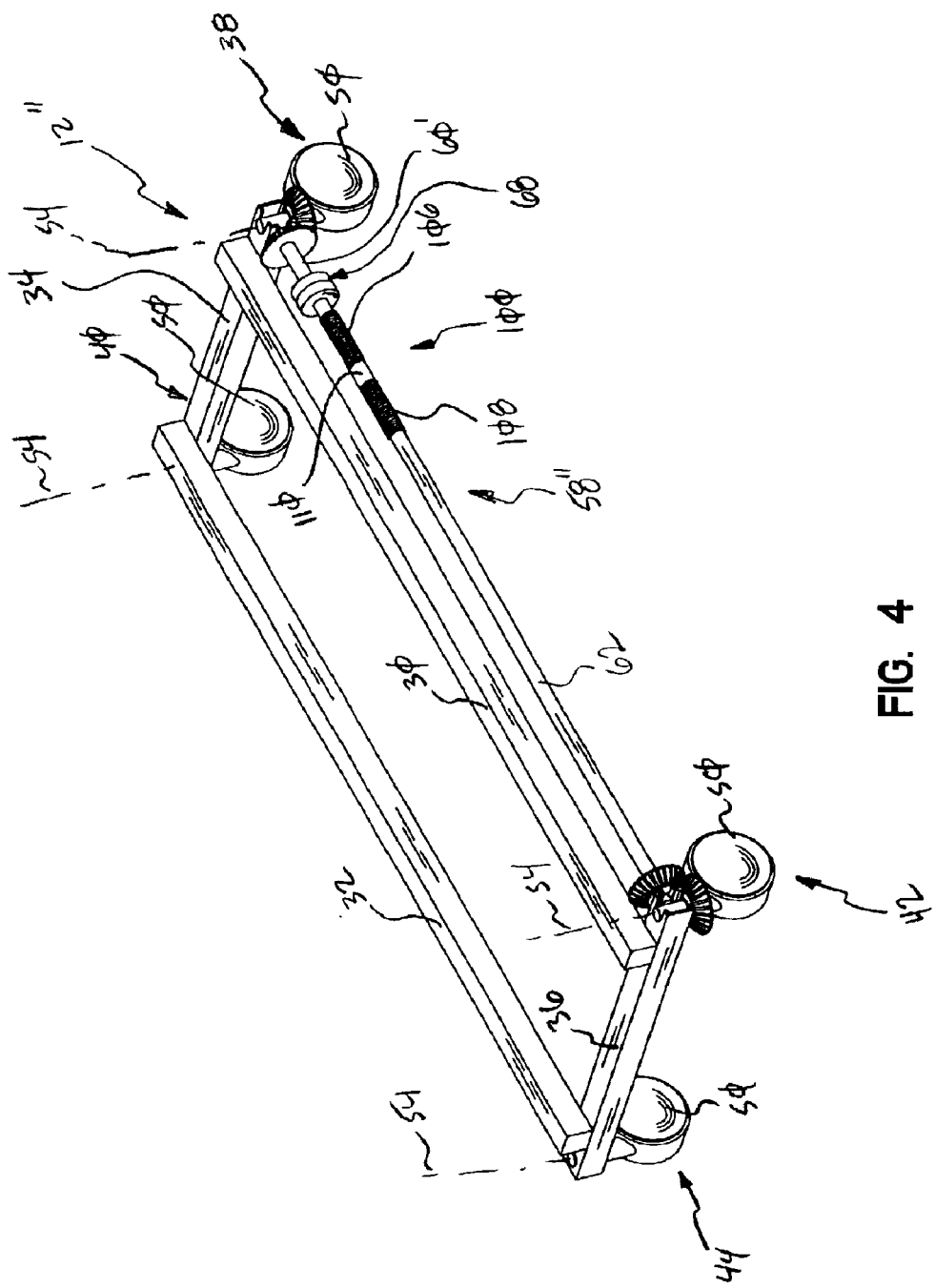
FIG. 4 is a perspective view of another illustrative embodiment of the wheel linkage apparatus of the present invention.

Turning now to FIGS. 3 and 5, an alternative embodiment of the linkage apparatus 12' of the present invention is illustrated as including a connector 58' and coupling 68 substantially identical to that described above with respect to the linkage apparatus 12 of FIGS. 2 and 4. However, the linkage apparatus 12' of FIGS. 3 and 5 utilizes a gear assembly 94 to transmit pivoting movement of each respective caster device 38 and 42 to the appropriate transmission shaft 60 and 62. The gear assemblies 94 each include a pair of beveled gears consisting of a crown gear 96 concentrically fixed to the mounting stud 46 above the caster housing 48 such that rotation of the caster wheel 50 about the substantially vertical axis 54 results in corresponding rotation of the crown gear 96. A second beveled gear, illustratively a pinion 98, is concentrically fixed to the distal end 65 of each of the first and second transmission shafts 60 and 62. The pinion 98 cooperably engages a respective crown gear 96 such that engagement of the crown gear 96 with the pinion gear 98 causes rotational movement of the connected transmission shaft 60, 62 about the longitudinal axis 66. As such, pivoting movement of the wheel 50 of either the first front caster device 38 or the first rear caster device 42 causes rotational movement of the transmission shafts 60 and 62, respectively, resulting in pivoting movement of the wheel 50 of the other interconnected caster device 42 or caster device 38.

The linkage apparatus 12' as illustrated in the embodiment of FIG. 3, includes an elastic member 100 operably connected to the connector or wheel coupling 58'. Illustratively, the elastic member 100 comprises a torsion spring interconnecting first and second portions 102 and 104 of the first transmission shaft 60'. The torsion spring 100 offers a predetermined resistance to externally applied torque caused by pivoting movement of caster devices 38 and 42 about respective vertical axes 54. The torsion spring 100 is selected to include a torsional modulus of elasticity sufficient to define a lower torque limit below which rotational movement is not transmitted between the first and second portions 102 and 104 of the transmission shaft 60'. As may be readily appreciated, the elastic member 100 thereby prevents undesired fluctuating of either the first front caster device 38 or first rear caster device 42 about its respective vertical axis 54 in response to minor pivoting of the other caster device 42 and 38.

Referring now to FIG. 4, in a further illustrative embodiment of linkage apparatus 12", the elastic member 100 of the wheel coupling 58" comprises first and second torsional springs 106 and 108. The first torsional spring 106 is connected to the second torsional spring 108 through a third transmission shaft or coupler 110. The first torsional spring 106 is torsionally preloaded in a first direction, while the second torsional spring 108 is torsionally preloaded in a second direction opposite the first direction. Preloading of the first and second torsional springs 106 and 108 in opposite directions facilitates improved accuracy and control of the linkage apparatus 12". More particularly, the cooperating preloaded first and second torsional springs 106 and 108 facilitate consistent driven pivoting movement of either the first front caster device 38 or first rear caster device 42 about its respective vertical axis 54 in response to driving pivoting movement of the other caster device 42 and 38 only when such driving pivoting movement exceeds a predetermined minimum value. The preloading of the first and second torsional springs 106 and 108 further facilitates transmission of an even torque rate by the first and second transmission shafts 60' and 62.

Figure 7:
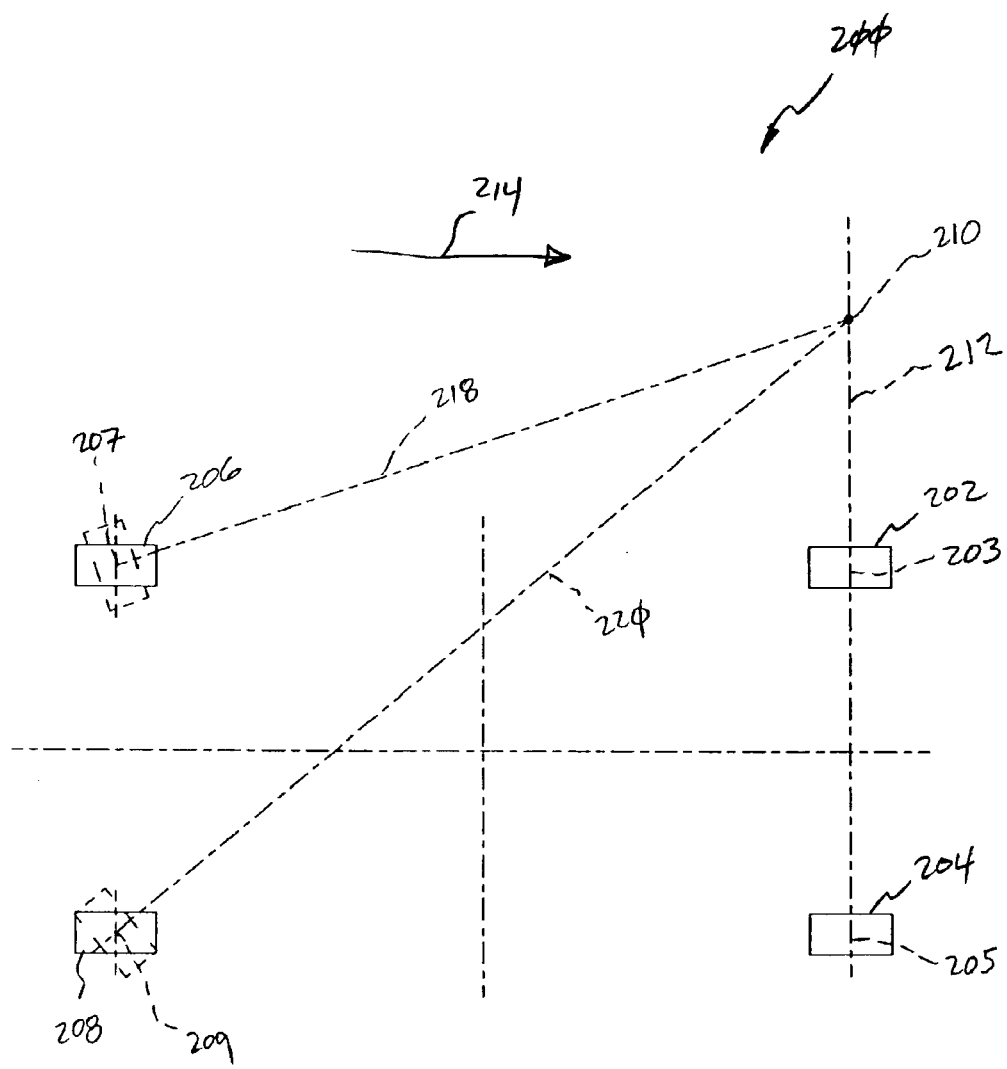
FIG. 7 is a diagrammatic top plan view illustrating the turning of a conventional patient support apparatus including four independently pivotable wheels, with the front wheels in a locked non-pivotable position.

Turning now to FIG. 7, a diagrammatic top plan view illustrates the turning of a conventional vehicle 200 including four casters 202, 204, 206, 208, wherein the rear casters 206 and 208 are pivotable about substantially vertical axes 207 and 209, respectively, while the front casters 202 and 204 are prevented from pivoting about vertical axes 203 and 205. Such a vehicle may comprise a bed including a caster steering mechanism of the type disclosed in U.S. Pat. No. 6,321,878, which is assigned to the assignee of the present invention and is expressly incorporated by reference herein. Such a caster steering mechanism locks the front pair of casters 202 and 204 from pivoting about their vertical axes 203 and 205, wherein turning of the bed 200 is achieved by providing an effective pivot point 210 substantially along a horizontal axis 212 defined by the locked wheels 202 and 204. For sideways or lateral motion, the locking device is disengaged such that the wheels of the caster devices 202, 204, 206, 208 are all independently pivotable about their respective vertical axes 203, 205, 207, 209. As illustrated, when the vehicle 200 is pushed in a forward direction as illustrated by arrow 214, the operator physically forces the vehicle 200 to turn about the pivot point 210 defined by the intersection of the horizontal rotational axes 218 and 220 of the pivoting rear casters 206 and 208. As may be appreciated, the location of the pivot point 210 will vary depending upon the degree of pivoting of the rear casters 206 and 208.

Figure 8:
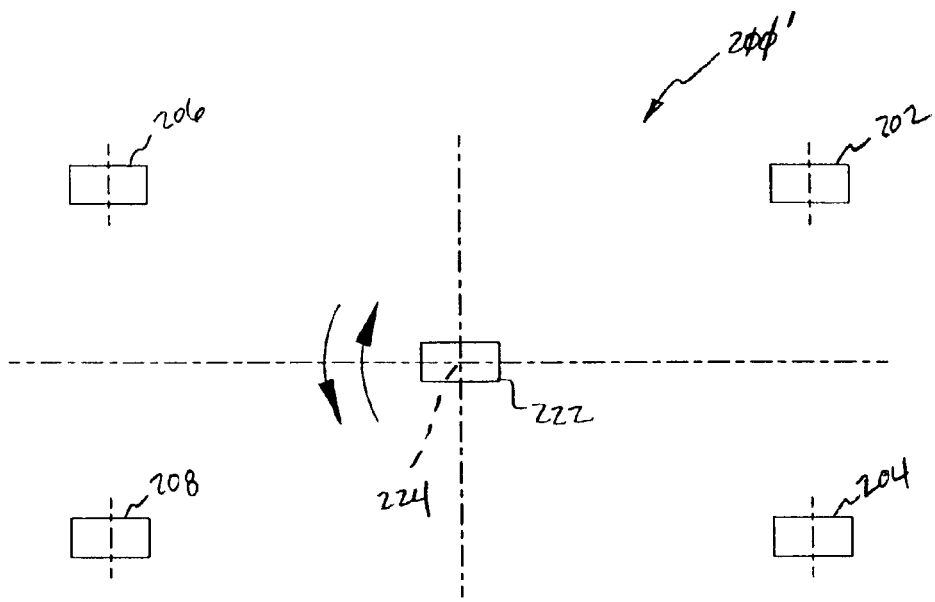
FIG. 8 is a diagrammatic top plan view illustrating the turning of a conventional patient support apparatus including a fifth wheel.

Turning now to FIG. 8, a vehicle 200' including a conventional fifth wheel 222 is illustrated for reducing the required turning area of the vehicle 200. The fifth wheel 222 is supported proximate the center of a wheel base frame. The fifth wheel 222 may be raised or lowered into contact with the floor and provides a new intersection defining the pivot point 224 for the vehicle 200'. However, conventional fifth wheel vehicles 200' require additional components under a center portion of the vehicle 200'. In many circumstances this is not desirable, and moreover, not possible due to design constraints.

Figure 9:
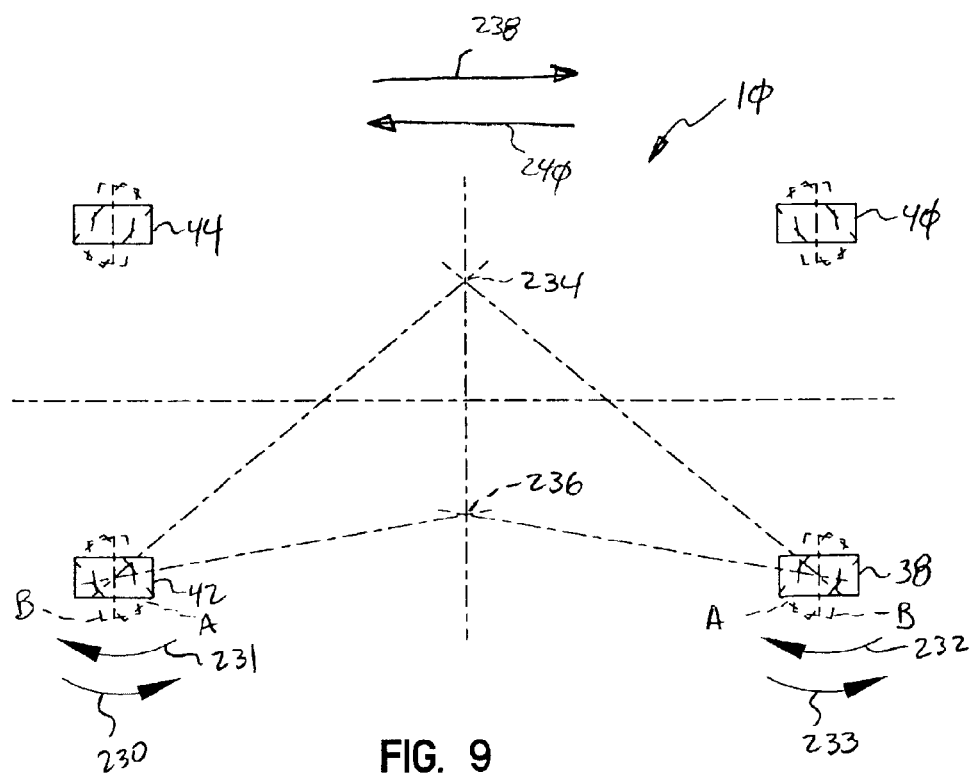
FIG. 9 is a diagrammatic top plan view illustrating the turning of a patient support including the bed linkage apparatus of the present invention.
Figure 10:
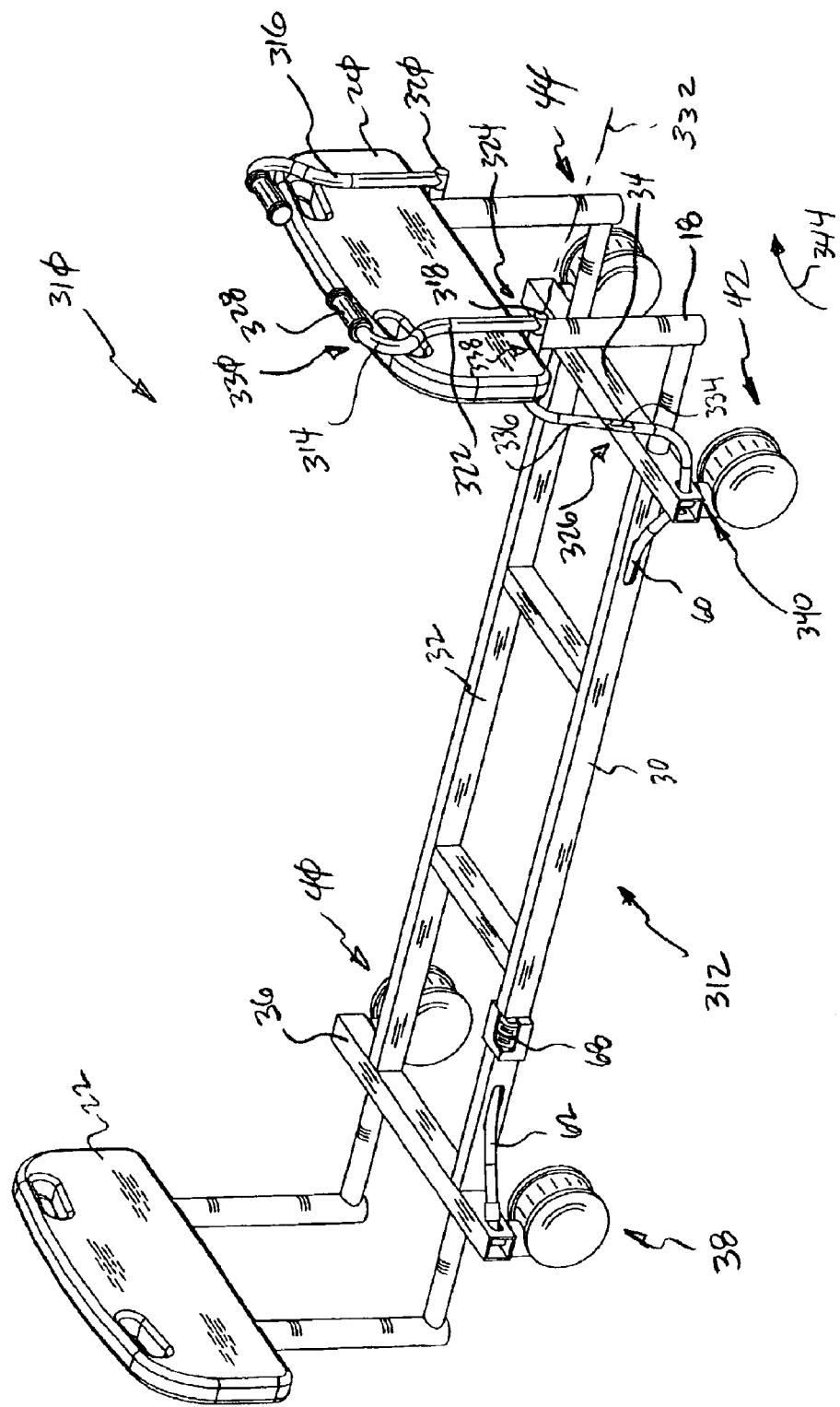
FIG. 10 is a perspective view of a further illustrative embodiment of the wheel linkage apparatus of the present invention including a pivotable handle.

FIG. 9 diagrammatically illustrates the operation of the vehicle 10 including the linkage apparatus 12 of the present invention. Since no fifth wheel is required, no additional components are required under the center of the vehicle 10. As detailed above, the linkage apparatus 12 may be placed adjacent one of the longitudinal side frame members 30, 32 of the base frame 18 in a non-intrusive manner.

Referring further to FIG. 9, pivoting of the rear caster device 42 in the counter-clockwise direction of arrow 230 to a driving position results in a corresponding and opposite pivoting of the front caster device 38 in the clockwise direction of arrow 232. Likewise, the rear caster device 42 may be pivoted in a clockwise direction as indicated by arrow 231 to a driving position, resulting in a corresponding and opposite pivoting of the front caster device 38 in the counterclockwise direction of arrow 233. When the rear caster device 42 is pivoted to position A in FIG. 8, the horizontal rotational axes 52 of the front and rear caster devices 38 and 42 define a pivot point 234, thereby reducing the effective turning area required for steering the vehicle 10. Similarly, when the rear caster device 42 is pivoted to position B of FIG. 8, the front and rear caster devices 38 and 42 define an effective pivot point 236. The remaining caster devices 40 and 44 may be freely pivotable and will tend to pivot such that their horizontal rotational axes 52 intersect at the respective pivot point 234, 236.

It should be appreciated that either the front or rear caster devices 38 or 42 may provide a driving pivoting movement which is transmitted by the connector 58 as passive pivoting movement to the other of the rear and front caster devices 42 and 38. In other words, the linkage apparatus 12 of the present invention facilitates turning or steering of the vehicle 10 in either a forward or reverse direction as indicated by arrows 238 and 240. Further, the elastic device, such as the torsional spring 100, provides that the passive pivoting movement is transmitted only when the differential between the driving position of the driving front or rear caster device 38 or 42 and the passive position of the other driven rear or front caster device 42 or 38, is at least as great as a predetermined minimum value. This predetermined minimum value is a function of the elasticity of the torsional spring 100. Likewise, the overload coupling 68 provides that the passive pivoting movement is transmitted only when the differential between the driving position of the driving front and rear caster device 38 or 42 and the passive position of the other driven rear or front caster device 42 or 38, is no greater than a predetermined maximum value. The predetermined maximum value is a function of the torque required to disengage the overload coupling 68.

As illustrated in FIGS. 10–13, in a further illustrative embodiment of the present invention, a hospital bed 310 includes a wheel linkage apparatus 312 configured to operably couple a first front caster 38 and a first rear caster 42. A pair of handles 314 and 316 are pivotably coupled to the base frame 18 of the bed 310 at pivot points 318 and 320. While in the following description, the handle 314 will be described in connection with the first front and rear casters 38 and 42, it should be appreciated that the second handle 316 may have a similar structure and may likewise be operably coupled to the second front and rear casters 40 and 44.

The handle 314 includes an elongate member 322 having a first end 324 operably coupled to an input coupling 326 at the pivot point 318. The handle 314 further includes a grip portion 328 supported at a second end 330 of the elongate member 322 and configured to be gripped by a user to facilitate movement of the bed 310. The input coupling 326 is configured to transmit pivoting movement of the handle 314 about a substantially horizontal axis 332 at the pivot point 318 to the first rear caster 42. The input coupling 326 illustratively comprises a flexible rotational shaft of the type well known in the art as including a rotatable cable 334 received within an outer sheath 336. A first end 338 of the input coupling 318 is operably coupled to the pivot point 318 of the handle 314, while a second end 340 of the input coupling 318 is operably coupled to an input bevel gear 342.

Figure 6:
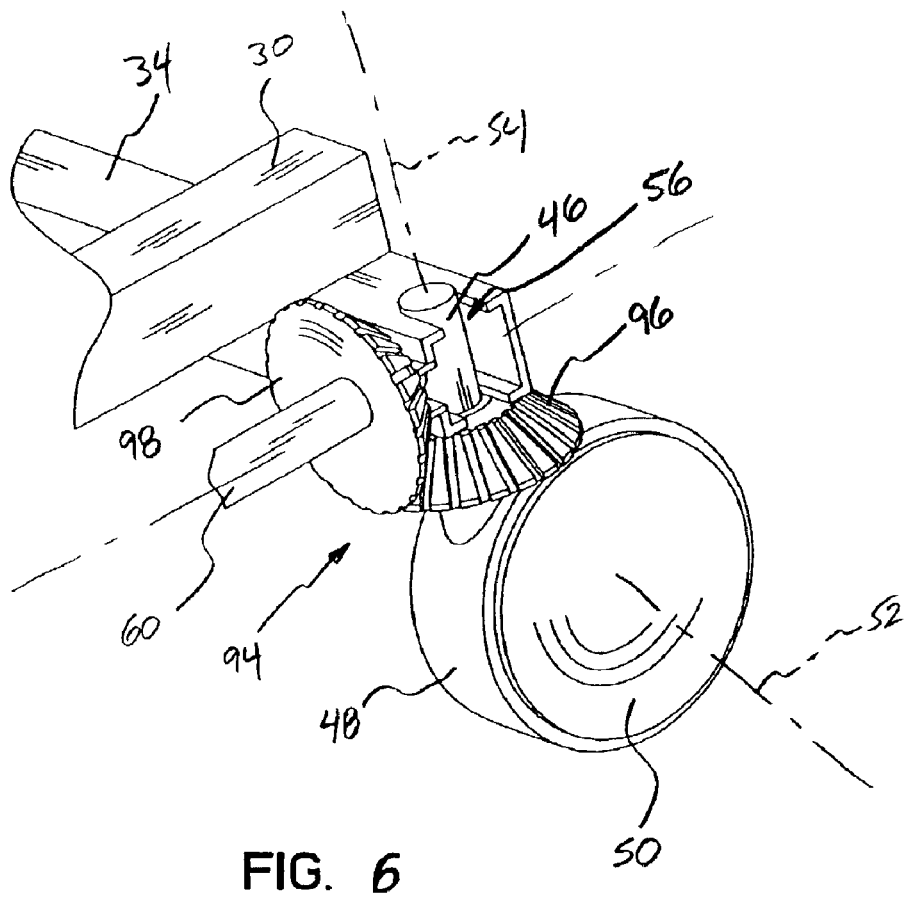
FIG. 6 is a detailed perspective view of a gear transmission assembly proximate a wheel of the bed linkage apparatus of the present invention.

With reference to FIG. 13, the bevel gear 342 is disposed within a substantially vertical plane and is operably coupled to the crown gear 96 concentrically fixed to the mounting stud 46 above the caster housing 48 in the manner detailed above with respect to FIG. 6. As may be appreciated, pivoting movement of the handle 314 in a clockwise direction as indicated by arrow 344, results in similar clockwise rotation of the bevel gear 342 in the direction of arrow 346 which, in turn, results in clockwise pivoting movement of the caster 42 in the direction of arrow 348. The wheel coupling 58 transmits pivoting movement of the first rear caster 42 and results in opposite pivoting movement of the first front caster 38 in the manner detailed above.

In summary, by pushing on the handle 314 when negotiating a right turn, the first handle 314 causes the input coupling 326 to rotate the first rear caster 42, thereby causing both the first front and rear caster devices 38 and 42 to pivot in a direction to assist in turning the bed 310 to the right. Likewise, by pushing on the handle 314 when negotiating a left turn, the handle 314 causes the input coupling 318 to rotate in a direction causing the caster devices 38 and 42 to pivot in a direction to assist in turning the bed 310 to the left.

Figure 11:
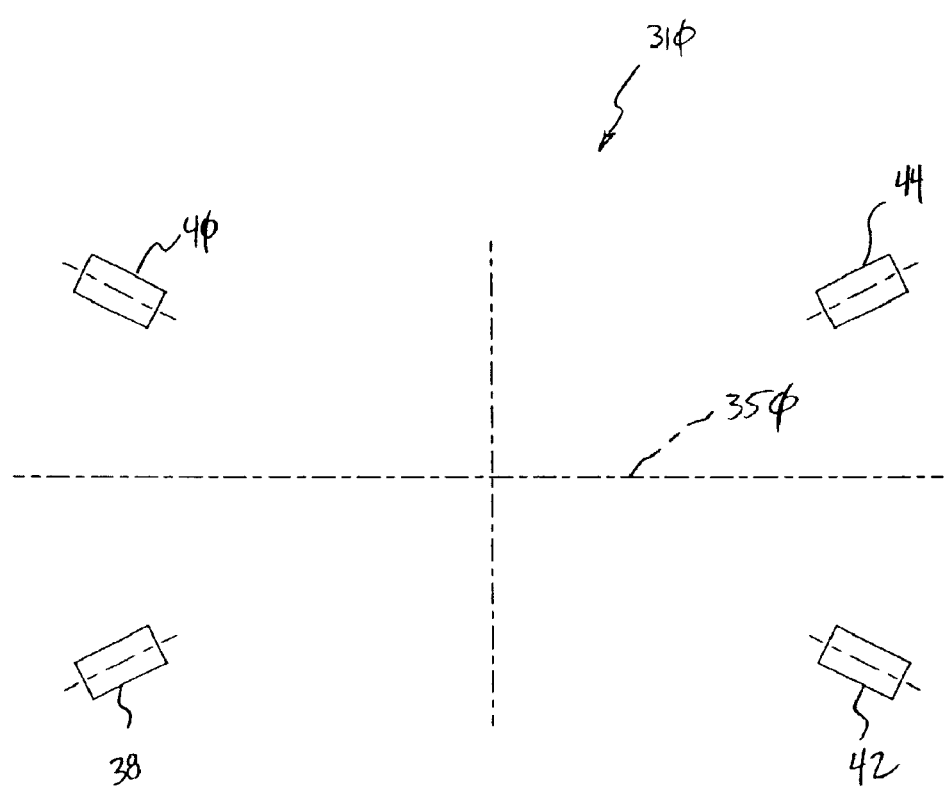
FIG. 11 is a diagrammatic top plan view of the bed linkage apparatus of the present invention illustrating a braking mode of operation.

With reference now to FIG. 11, both the first and second sets of front and rear caster devices 38, 42 and 40, 44 may be linked through the wheel linkage apparatus 312. In such as case, pivoting movement of both first and second handles 314 and 316 toward the longitudinal center axis 350 of the hospital bed 310 may be utilized to provide a pivoting movement of the caster devices 38, 42 and 40, 44 in opposite directions. With the caster devices 38, 42 and 40, 44 splayed outwardly from the longitudinal center axis 350 of the bed 310, the caster devices 38, 42 and 40, 44 perform a braking function and prevent movement of the bed 310.

Turning now to FIGS. 12–15, a further alternative embodiment hospital bed 410 includes the wheel linkage apparatus 312 as detailed above. The hospital bed 410 further includes a first actuator 412 operably coupled to the wheel 50 of the first front caster device 38 and configured to drive the wheel 50 in rotation about its substantially horizontal axis 52. A second actuator 414 is operably coupled to the wheel 50 of the first rear caster device 42 and is configured to drive the wheel 50 in rotation about its substantially horizontal axis 52. The first and second actuators 412 and 414 may comprise conventional pancake motors which are received within the respective caster housings 48.

Figure 14:
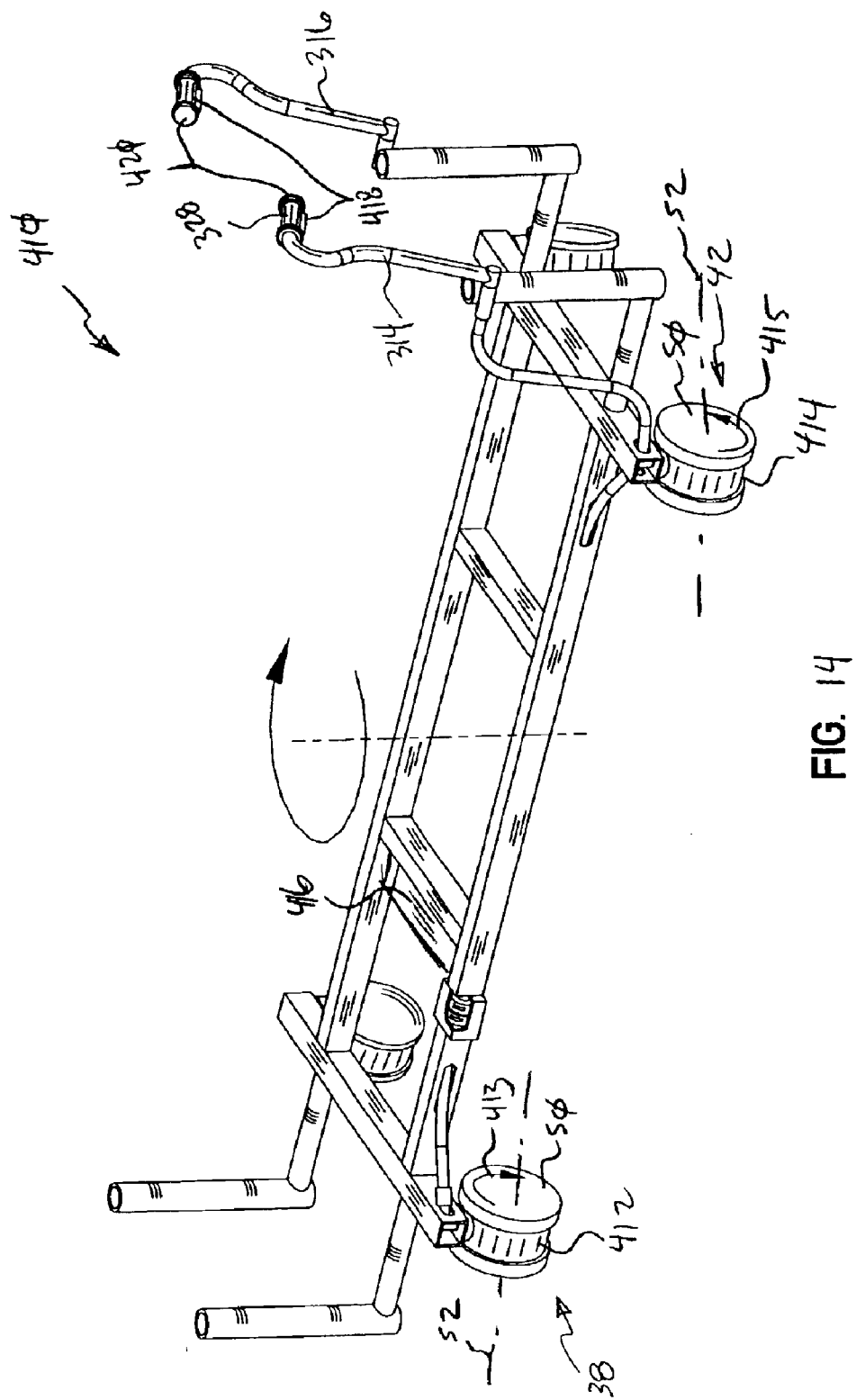
FIG. 14 is a perspective view of the wheel linkage apparatus of FIG. 12 in a powered rotation mode of operation.
Figure 15:
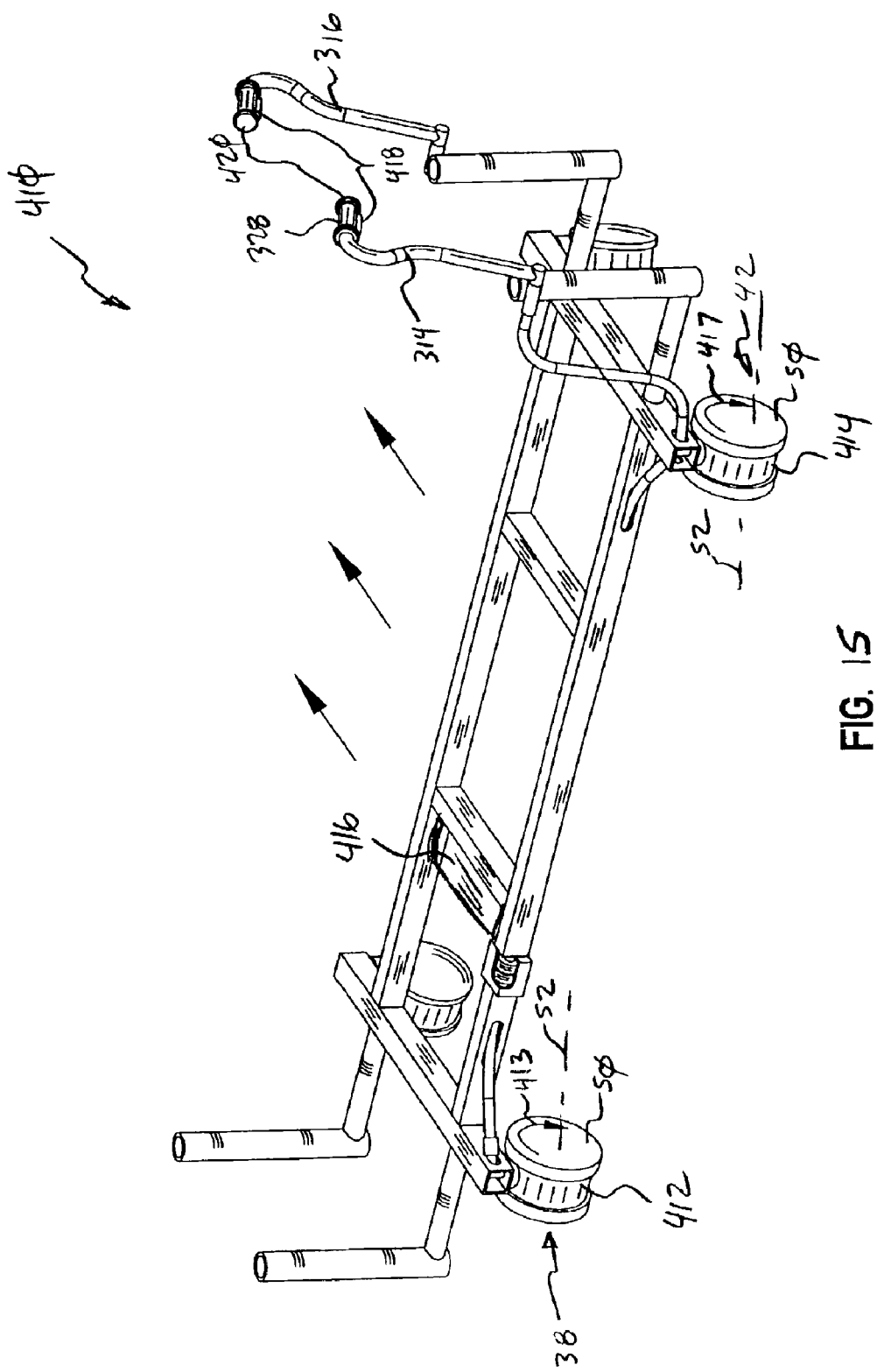
FIG. 15 is a perspective view of the wheel linkage apparatus of FIG. 12 in a powered slide mode of operation.

A controller 416 is supported by the base frame 18 of the bed 410 and is configured to cause the first actuator 412 to drive the wheel 50 of the first front caster device 38 in rotation about its axis 52 in a first direction (arrow 413), and to cause the second actuator 414 to drive the wheel 50 of the first rear caster device 42 in rotation about its axis 52 in a second direction (arrow 415), the first direction being opposite the second direction, in response to pivoting movement of the handle 314 during a powered rotation mode of operation. (FIG. 14). The controller 416 is further configured to cause the first actuator 412 to drive the wheel 50 of the first front caster device 38 in rotation about its axis 52 in a first direction (arrow 413), and to cause the second actuator 414 to drive the wheel 50 of the first rear caster device 42 in rotation about its axis in the same first direction (arrow 417), in response to pivoting movement of the handle 314 during a powered slide mode of operation (FIG. 15). A first switch 418 is coupled proximate the grip portion 328 of the handle 314, wherein actuation of the first switch 418 causes the controller 416 to operate in the powered rotation mode of operation. A second switch 420 may likewise be coupled to the handle 314 proximate the grip portion 328 and in spaced relation to the first switch 418. When actuated, the second switch 420 causes the controller 416 to operate in the powered slide mode of operation. The powered rotation mode of operation as illustrated in FIG. 14 is utilized when maneuvering the bed 410 during normal conditions, such as when maneuvering around obstacles. The powered slide mode of operation is utilized when manipulating the bed 410 for substantially lateral movement, such as when sliding the bed 410 into a position adjacent a wall.

Although the invention has been described in detail with reference to the certain illustrative embodiments, variations and modifications exist within the spirit and scope of the present invention as defined in the following claims.

What is claimed is:

1. A vehicle comprising:
   a first wheel supported for rotational movement about a first substantially horizontal axis and supported for pivoting movement about a first substantially vertical axis;
   a second wheel supported in spaced relation to said first wheel, said second wheel supported for rotational movement about a second substantially horizontal axis and supported for pivoting movement about a second substantially vertical axis;
   a wheel coupling in communication with said first wheel and said second wheel, said wheel coupling configured to transmit pivoting movement of said second wheel about said second substantially vertical axis to said first wheel and produce pivoting movement of said first wheel about said first substantially vertical axis; and
   means for establishing a lower torque limit below which pivoting movement of said second wheel is not transmitted by said wheel coupling to said first wheel.

2. The vehicle of claim 1, further comprising means for establishing an upper torque limit above which pivoting movement of said second wheel is not transmitted by said wheel coupling to said first wheel.

3. The vehicle of claim 2, wherein said means for establishing an upper torque comprises a breakaway coupling which transmits rotational movement only when torque applied to said breakaway coupling is below a predetermined value.

4. The vehicle of claim 1, wherein said means for establishing a lower torque limit comprises a torsion spring having a torsional modulus of elasticity selected to define said lower torque limit.

5. A vehicle comprising:
   a first wheel supported for rotational movement about a first substantially horizontal axis and supported for pivoting movement about a first substantially vertical axis;
   a second wheel supported in spaced relation to said first wheel, said second wheel supported for rotational movement about a second substantially horizontal axis and supported for pivoting movement about a second substantially vertical axis;
   a wheel coupling in communication with said first wheel and said second wheel, said wheel coupling configured to transmit pivoting movement of said second wheel about said second substantially vertical axis to said first wheel and produce pivoting movement of said first wheel about said first substantially vertical axis;
   means for establishing an upper torque limit above which pivoting movement of said second wheel is not transmitted by said wheel coupling to said first wheel; and
   means for establishing a lower torque limit below which pivoting movement of said second wheel is not transmitted by said connector to said first wheel.

6. The vehicle of claim 5, wherein said means for establishing said lower torque limit comprises a torsion spring having a torsional modulus of elasticity selected to define said lower torque limit.

7. The vehicle of claim 5, wherein said means for establishing upper torque limit comprises a breakaway coupling which transmits rotational movement only when torque applied to said breakaway coupling is below a predetermined value.

8. A vehicle comprising:
   a first wheel supported for rotational movement about a first substantially horizontal axis and supported for pivoting movement about a first substantially vertical axis;

a second wheel supported in spaced relation to said first wheel, said second wheel supported for rotational movement about a second substantially horizontal axis and supported for pivoting movement about a second substantially vertical axis;

a wheel coupling in communication with said first wheel and said second wheel, said wheel coupling configured to transmit pivoting movement of said second wheel about said second substantially vertical axis to said first wheel and produce pivoting movement of said first wheel about said first substantially vertical axis, said wheel coupling further configured to transmit a torque between said first wheel and said second wheel; and means for establishing an upper torque limit, wherein pivoting movement of said second wheel is not transmitted by said wheel coupling to said first wheel when said torque is above said upper torque limit.

9. The vehicle of claim 8, further comprising means for establishing a lower torque limit below which pivoting movement of said second wheel is not transmitted by said connector to said first wheel.

10. The vehicle of claim 9, wherein said means for establishing said lower torque limit comprises a torsion spring having a torsional modulus of elasticity selected to define said lower torque limit.

11. The vehicle of claim 8, wherein said means for establishing upper torque limit comprises a breakaway coupling which transmits rotational movement only when torque applied to said breakaway coupling is below a predetermined value.

12. A vehicle comprising:
a first wheel supported for rotational movement about a first substantially horizontal axis and supported for pivoting movement about a first substantially vertical axis;

a second wheel supported in spaced relation to said first wheel, said second wheel supported for rotational movement about a second substantially horizontal axis and supported for pivoting movement about a second substantially vertical axis;

a wheel coupling in communication with said first wheel and said second wheel, said wheel coupling configured to transmit pivoting movement of said second wheel about said second substantially vertical axis to said first wheel and produce pivoting movement of said first wheel about said first substantially vertical axis; and an elastic device operably connected to said wheel coupling, wherein said elastic device establishes a lower torque limit below which pivoting movement of said second wheel is not transmitted by said wheel coupling to the said first wheel.

13. The vehicle of claim 12, wherein said elastic device comprises a torsion spring having a torsional modulus of elasticity selected to define said lower torque limit.

14. The vehicle of claim 12, further comprising a frame including opposing longitudinally extending sides, said first wheel and said second wheel coupled to said frame proximate the same one of said sides.

15. The vehicle of claim 12, wherein said wheel coupling is further configured to cause pivoting movement of said first wheel in a first direction in response to pivoting movement of said second wheel in a second direction opposite said first direction.

16. The vehicle of claim 12, further comprising a frame coupled to said first and second wheels, and a patient support surface coupled to said frame.

17. The vehicle of claim 12, wherein said wheel coupling comprises a first transmission member coupled to said first wheel and a second transmission member coupled to said second wheel, and a release coupling connects said first transmission member and said second transmission member.

18. The vehicle of claim 17, wherein said release coupling establishes an upper torque limit above which pivoting movement of said second wheel is not transmitted by said wheel coupling to said first wheel.

19. The vehicle of claim 18, wherein said release coupling comprises a breakaway coupling which transmits rotational motion between said first and second transmission members only when torque between said first and second members is below a predetermined value.

20. The vehicle of claim 19, wherein said release coupling includes a first coupling member supported by said first transmission member and a second coupling member supported by said second transmission member, one of said first and second coupling members supporting a detent and the other of said first and second coupling members supporting a locking recess, said detent receivable within said locking recess.

21. The vehicle of claim 17, wherein said release coupling is configured to be controlled by an input device activated by an operator.

22. A vehicle comprising:
a first wheel supported for rotational movement about a first substantially horizontal axis and supported for pivoting movement about a first substantially vertical axis;

a second wheel supported in spaced relation to said first wheel, said second wheel supported for rotational movement about a second substantially horizontal axis and supported for pivoting movement about a second substantially vertical axis;

a wheel coupling in communication with said first wheel and said second wheel, said wheel coupling configured to transmit pivoting movement of said second wheel about said second substantially vertical axis to said first wheel and produce pivoting movement of said first wheel about said first substantially vertical axis, said wheel coupling further configured to transmit a torque between said first wheel and said second wheel; and a release coupling in communication with said wheel coupling, said release coupling configured to establish an upper torque limit, wherein pivoting movement of said second wheel is not transmitted by said wheel coupling to said first wheel when said torque is above said upper torque limit.

23. The vehicle of claim 22, further comprising a frame including opposing longitudinally extending sides, said first wheel and said second wheel coupled to said frame proximate the same one of said sides.

24. The vehicle of claim 22, wherein said wheel coupling is further configured to cause pivoting movement of said first wheel in a first direction in response to pivoting movement of said second wheel is in a second direction opposite said first direction.

25. The vehicle of claim 22, further comprising a frame coupled to said first and second wheels, and a patient support surface coupled to said frame.

26. The vehicle of claim 22, wherein said wheel coupling comprises a first transmission member coupled to said first wheel and a second transmission member coupled to said second wheel, said release coupling connecting said first transmission member and said second transmission member.

27. The vehicle of claim 26, wherein said release coupling comprises a breakaway coupling which transmits rotational motion between said first and second transmission members only when torque between said first and second transmission members is below a predetermined value.

28. The vehicle of claim 27, wherein said release coupling includes a first coupling member supported by said first transmission member and a second coupling member supported by said second transmission member, one of said first and second coupling members supporting a detent and the other of said first and second coupling members supporting a locking recess, said detent receivable within said locking recess.

29. The vehicle of claim 22, further comprising an elastic device operably connected to said wheel coupling, wherein said elastic device establishes a lower torque limit below which pivoting movement of said second wheel is not transmitted by said connector to said first wheel.

30. The vehicle of claim 29, wherein said elastic device comprises a torsion spring having a torsional modulus of elasticity selected to define said lower torque limit.

31. A patient support comprising:
    a frame including opposing first and second longitudinally extending sides;
    a patient support surface coupled to said frame;
    first and second laterally spaced front wheels coupled to said frame;
    first and second laterally spaced rear wheels coupled to said frame and positioned in longitudinally spaced relation to said first and second laterally spaced front wheels;
    a wheel coupling providing communication between said first front wheel and said first rear wheel, wherein a driving pivoting movement of one of said first front wheel and said first rear wheel causes said wheel coupling to transmit a passive pivoting movement to the other of said first rear wheel and said first front wheel only when said driving pivoting movement exceeds a lower limit, and
    a release coupling, wherein said release coupling does not transmit said passive pivoting movement when said driving pivoting movement exceeds an upper limit.

32. The vehicle of claim 31, wherein said wheel coupling is further configured to cause pivoting movement of said first front wheel in a direction opposite said pivoting movement of said first rear wheel.

33. The vehicle of claim 31, further comprising an elastic device operably connected to said wheel coupling, wherein said elastic device establishes said lower limit.

34. The vehicle of claim 33, wherein said elastic device comprises a torsion spring having a torsional modulus of elasticity selected to define said lower limit.

35. The patient support of claim 31, wherein said release coupling selectively transmits said passive pivoting movement.

36. The patient support of claim 35, wherein said wheel coupling comprises a first transmission member coupled to said at least one front wheel and a second transmission member coupled to said at least one rear wheel, said release coupling connecting said first transmission member and said second transmission member.

37. The vehicle of claim 36, wherein said release coupling comprises a breakaway coupling which transmits rotational motion between said first and second transmission members only when torque between said first and second members is below a predetermined value.

38. The vehicle of claim 37, wherein said overload coupling includes a first coupling member supported by said first transmission member and a second coupling member supported by said second transmission member, one of said first and second coupling members supporting a detent and the other of said first and second coupling members supporting a locking recess, said detent receivable within said locking recess.

39. A vehicle comprising:
    a first wheel supported for rotational movement about a first substantially horizontal axis and supported for pivoting movement about a first substantially vertical axis;
    a second wheel supported in spaced relation to said first wheel, said second wheel supported for rotational movement about a second substantially horizontal axis and supported for pivoting movement about a second substantially vertical axis;
    a wheel coupling in communication with said first wheel and said second wheel, said wheel coupling configured to transmit pivoting movement of said second wheel about said second substantially vertical axis to said first wheel and produce pivoting movement of said first wheel about said first substantially vertical axis;
    a release coupling in communication with said wheel coupling, wherein said release coupling establishes an upper torque limit above which pivoting movement of said second wheel is not transmitted by said wheel coupling to said first wheel; and
    an elastic device operably connected to said wheel coupling, wherein said elastic device establishes a lower torque limit below which pivoting movement of said second wheel is not transmitted by said connector to said first wheel.

40. The vehicle of claim 39, wherein said elastic device comprises a torsion spring having a torsional modulus of elasticity selected to define said lower torque limit.

41. The vehicle of claim 39, further comprising a frame including opposing longitudinally extending sides, said first wheel and said second wheel coupled to said frame proximate the same one of said sides.

42. The vehicle of claim 39, wherein said wheel coupling is further configured to cause pivoting movement of said first wheel in a first direction in response to pivoting movement of said second wheel is in a second direction opposite said first direction.

43. The vehicle of claim 39, further comprising a frame coupled to said first and second wheels, and a patient support surface coupled to said frame.

44. The vehicle of claim 39, wherein said wheel coupling comprises a first transmission member coupled to said first wheel and a second transmission member coupled to said second wheel, said release coupling connecting said first transmission shaft and said second transmission member.

45. The vehicle of claim 44, wherein said release coupling comprises a breakaway coupling which transmits rotational motion between said first and second transmission members only when torque between said first and second transmission members is below a predetermined value.

46. The vehicle of claim 45, wherein said release coupling includes a first coupling member supported by said first transmission member and a second coupling member supported by said second transmission member, one of said first and second coupling members supporting a detent and the other of said first and second coupling members supporting a locking recess, said detent receivable within said locking recess.

* * * * *